(12) United States Patent
Minohata et al.

(10) Patent No.: US 11,415,563 B2
(45) Date of Patent: Aug. 16, 2022

(54) METHOD FOR ANALYZING SAMPLE BY LIQUID CHROMATOGRAPH MASS SPECTROMETRY

(71) Applicants: SHIMADZU CORPORATION, Kyoto (JP); National Institute for Environmental Studies, Tsukuba (JP)

(72) Inventors: Toshikazu Minohata, Kyoto (JP); Jun Watanabe, Kyoto (JP); Shoji Nakayama, Tsukuba (JP)

(73) Assignees: SHIMADZU CORPORATION, Kyoto (JP); NATIONAL INSTITUTE FOR ENVIRONMENTAL STUDIES, Tsukuba (JP)

(*) Notice: Subject to any disclaimer, the term of this patent is extended or adjusted under 35 U.S.C. 154(b) by 267 days.

(21) Appl. No.: 16/604,385

(22) PCT Filed: Apr. 13, 2017

(86) PCT No.: PCT/JP2017/015184
§ 371 (c)(1),
(2) Date: Oct. 10, 2019

(87) PCT Pub. No.: WO2018/189871
PCT Pub. Date: Oct. 18, 2018

(65) Prior Publication Data
US 2020/0158701 A1    May 21, 2020

(51) Int. Cl.
*G01N 30/72* (2006.01)
*G01N 30/20* (2006.01)
(Continued)

(52) U.S. Cl.
CPC ......... *G01N 30/7233* (2013.01); *G01N 30/20* (2013.01); *G01N 30/461* (2013.01);
(Continued)

(58) Field of Classification Search
CPC ..... G01N 2030/027; G01N 2030/8822; G01N 30/20; G01N 30/34; G01N 30/461; G01N 30/462; G01N 30/7233; G01N 30/88
See application file for complete search history.

(56) References Cited

U.S. PATENT DOCUMENTS 6,318,157 B1 * 11/2001 Corso ................. G01N 30/466
                                                        210/659
6,942,793 B2 *  9/2005 Ito .................... G01N 30/463
                                                        210/659
(Continued)

FOREIGN PATENT DOCUMENTS

JP    2002257806 A    9/2002
JP    2002-372522 A   12/2002
(Continued)

OTHER PUBLICATIONS

Andrew J. Link et al., "Direct analysis of protein complexes using mass spectrometry", Nature Biotechnology, Jul. 1999, pp. 676-682, vol. 17.
(Continued)

*Primary Examiner* — Nimeshkumar D Patel
*Assistant Examiner* — Gedeon M Kidanu
(74) *Attorney, Agent, or Firm* — Sughrue Mion, PLLC

(57) ABSTRACT

In an LC/MS/MS analysis: injecting a sample into a passage leading to a column group provided in a liquid chromatograph, the column group including a plurality of columns serially connected to each other and packed with different kinds of packing materials; supplying an eluant to one or a plurality of columns including a column located most downstream, to separate a portion of the target components in the sample in the one or plurality of columns, and sequentially elute those components from the most downstream column to perform mass spectrometry; and supplying a different eluant to one or a plurality of columns including the most
(Continued)

downstream column, to separate at least a portion of the target components which stayed uneluted in the one or plurality of columns in the first analysis step, and sequentially elute those components from the most downstream column to perform mass spectrometry.

4 Claims, 3 Drawing Sheets

(51) Int. Cl.
 G01N 30/46 (2006.01)
 G01N 30/88 (2006.01)
 G01N 30/02 (2006.01)
(52) U.S. Cl.
 CPC ....... *G01N 30/88* (2013.01); *G01N 2030/027* (2013.01); *G01N 2030/8822* (2013.01)

(56) References Cited

U.S. PATENT DOCUMENTS

| | | | | |
|---|---|---|---|---|
| 7,214,313 | B2* | 5/2007 | Hayashi | G01N 30/463 |
| | | | | 210/656 |
| 7,537,694 | B2* | 5/2009 | Watanabe | G01N 30/463 |
| | | | | 210/659 |
| 8,968,561 | B2* | 3/2015 | Kono | B01D 15/20 |
| | | | | 210/656 |
| 10,969,368 | B2* | 4/2021 | Yoshino | G01N 30/08 |
| 2003/0168392 | A1* | 9/2003 | Masuda | G01N 30/463 |
| | | | | 422/70 |
| 2004/0124128 | A1* | 7/2004 | Iwata | G01N 30/462 |
| | | | | 210/198.2 |
| 2004/0173509 | A1* | 9/2004 | Ito | G01N 30/463 |
| | | | | 210/94 |
| 2005/0218055 | A1* | 10/2005 | Hayashi | G01N 30/463 |
| | | | | 210/198.2 |
| 2010/0276350 | A1* | 11/2010 | Kono | B01D 15/20 |
| | | | | 210/198.2 |
| 2011/0101215 | A1 | 5/2011 | Hirabayashi et al. | |
| 2016/0238573 | A1* | 8/2016 | Venkatramani | G01N 30/462 |

FOREIGN PATENT DOCUMENTS

| | | |
|---|---|---|
| JP | 2008-304435 A | 12/2008 |
| JP | 2008304435 A * | 12/2008 |
| JP | 2010-276358 A | 12/2010 |
| WO | 2009/123297 A1 | 10/2009 |

OTHER PUBLICATIONS

International Search Report for PCT/JP2017/015184 dated Jun. 20, 2017 [PCT/ISA/210].

Written Opinion for PCT/JP2017/015184 dated Jun. 20, 2017 [PCT/ISA/237].

Communication dated Jul. 7, 2020 from the Japanese Patent Office in Application No. 2019-512135 Translation.

* cited by examiner

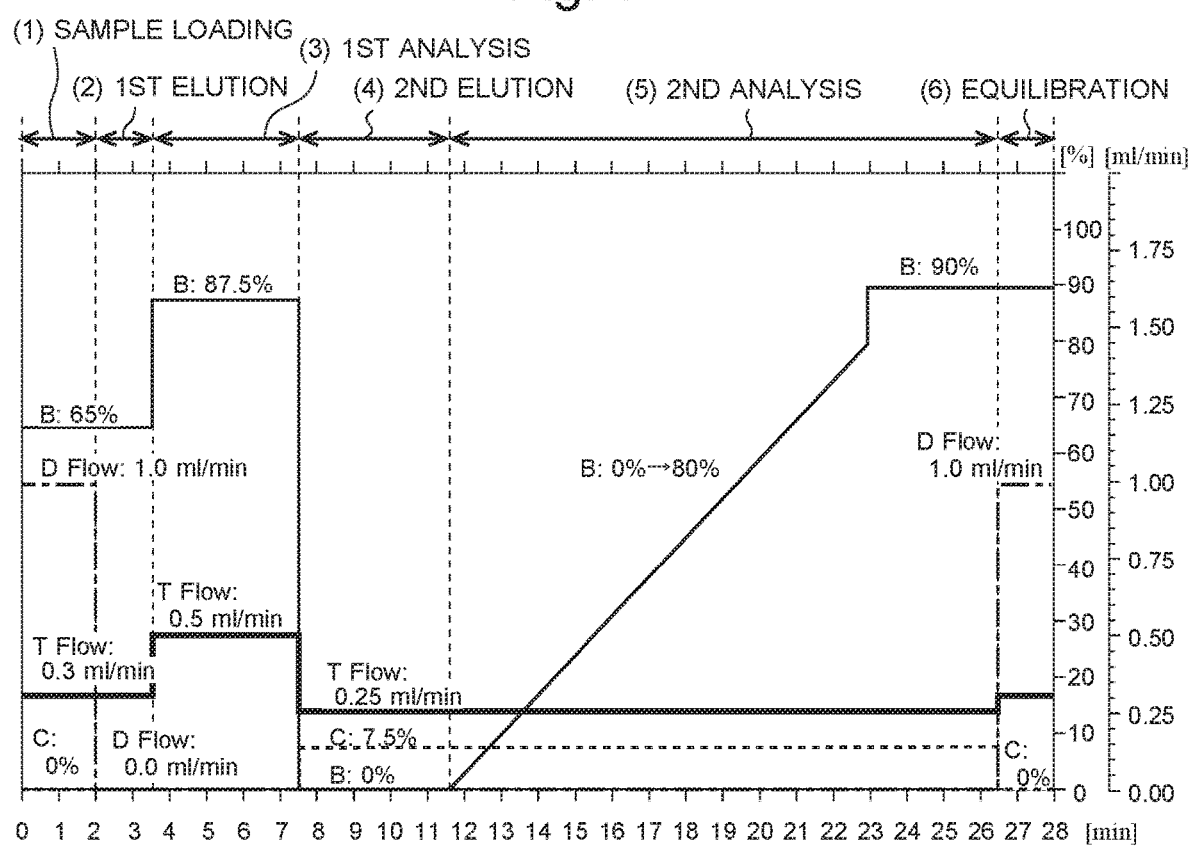

METHOD FOR ANALYZING SAMPLE BY LIQUID CHROMATOGRAPH MASS SPECTROMETRY

CROSS REFERENCE TO RELATED APPLICATIONS

This application is a National Stage of International Application No. PCT/JP2017/015184 filed Apr. 13, 2017.

TECHNICAL FIELD

The present invention relates to a method for analyzing a sample by liquid chromatograph mass spectrometry (LC/MS analysis or LC/MS/MS analysis), and more specifically, to an analysis method that is suitable for an analysis of a sample containing target components having a wide variety of chemical or physical properties.

BACKGROUND ART

In an LC/MS/MS analysis, a suppression of the ionization of a target component ("ion suppression") or promotion of the ionization ("ion enhancement") may occur in the mass spectrometry (MS) due to an elution of an impurity in the sample with the same retention time as the target component in the liquid chromatography (LC) (for example, see Patent Literature 1). The ion suppression or ion enhancement may cause a deterioration in the reproducibility of the quantitative determination. Therefore, it is necessary to appropriately separate various target components from impurities contained in a sample in the LC.

In recent years, quantitative analyses of environmental pollutants in biological samples (e.g. blood plasma) by LS/MS/MS analyses have been widely performed in order to investigate the influence of the environmental pollutants on human bodies. Among the environmental pollutants, the organic fluorine compounds (perfluoroalkyl acids: PFAAs) and their related substances (e.g. PFCAs, PFASs, FOSA, FTS and PAP) are known as persistent organic pollutants. These compounds significantly change their compound characteristics (water solubility, lipid solubility, etc.) depending on the length of their carbon chain. Therefore, as long as the LC is performed under a single condition, it is difficult to make those components be in a suitable state for MS/MS analysis, i.e. in a state in which each target component is sufficiently separated from the other target components and impurities. This inevitably causes problems, such as the ion suppression of low molecular compounds (PFBA, PFPeA, PFHxA and 4:2FTS), the ion suppression of N-MeFOSA-M and N-EtFOSA-M, as well as the ion enhancement of 6:2FTS and 8:2FTS among the PFAAs and their related substances.

Therefore, in the case of performing an LC/MS/MS analysis on PFAAs and their related substances in blood plasma, it has conventionally been necessary to perform the analysis for one sample of blood plasma multiple times (e.g. three times) under different LC conditions.

CITATION LIST

Patent Literature

Patent Literature 1: WO 2009/123297 A (paragraph [0002])

SUMMARY OF INVENTION

Technical Problem

Needless to say, such a method lowers the throughput of the analysis since the analysis for one sample must be performed multiple times. There are also other problems, such as the necessity to divide the sample to perform the analysis multiple times, as well as the necessity to guarantee that the sets of data acquired by performing an LC/MS/MS analysis multiple times have been derived from the same sample.

Such problems are not limited to the aforementioned analyses of PFAAs and their related substances. Those problems are common to any case in which an LC/MS analysis or LC/MS/MS analysis is performed on a sample containing a considerable number of target components having different chemical or physical properties.

The present invention has been developed in view of the previously described problems. Its objective is to provide a method by which a sample containing a considerable number of target components having different chemical or physical properties can be collectively analyzed by a single LC/MS analysis or LC/MS/MS analysis.

Solution to Problem

A method for analyzing a sample by liquid chromatograph mass spectrometry according to the present invention developed for solving the previously described problems includes:

a) a sample injection step in which a sample is injected into a column located most upstream in a column group provided in a liquid chromatograph, the column group including a plurality of columns which are configured to be serially connectable to each other and are respectively packed with different kinds of packing materials:

b) a first analysis step in which a first eluant is supplied to one column or a plurality of serially connected columns including a column located most downstream in the column group, to separate a portion of the target components in the sample in the one or plurality of serially connected columns, and sequentially elute the separated components from the most downstream column to analyze the components with a mass spectrometer; and c) a second analysis step in which a second eluant that is different from the first eluant in composition is supplied to one column or a plurality of serially connected columns including the most downstream column in the column group, to separate at least a portion of the target components in the sample which stayed uneluted in the one column or the plurality of serially connected columns in the first analysis step, and sequentially elute the separated components from the most downstream column to analyze the components with the mass spectrometer.

The "one column or a plurality of serially connected columns including a column located most downstream" in the first analysis step and the second analysis step may be a portion of the columns constituting the column group or all of those columns. The "one or a plurality of serially connected columns" in the second analysis step may or may not be identical to the "one or a plurality of serially connected columns" in the first analysis step.

According to the present invention, a plurality of LC separations with different separation characteristics can be performed in a liquid chromatograph mass spectrometric analysis (LC/MS analysis or LC/MS/MS analysis) with a single injection of a sample. Therefore, in an analysis of a sample containing target components having a wide variety of characteristics, each target component can be appropriately separated from the other target components and impurities. Consequently, a highly reproducible mass spectrometric analysis with a reduced amount of influence of the ion enhancement or ion suppression can be performed.

In the method for analyzing a sample according to the present invention, it is preferable that the different kinds of packing materials include at least a packing material corresponding to an ion exchange mode and a packing material corresponding to a reversed phase mode.

In the method for analyzing a sample according to the present invention, at least one column which is included in the plurality of columns constituting the column group and is not the most downstream column may be a trap column for trapping a sample, while the other columns may be separation columns for separating a sample into components.

In this case, it is preferable that an elution step in which at least a portion of the target components trapped in the trap column is eluted from the trap column be provided in a stage between the sample injection step and the first analysis step, or in a stage between the first analysis step and the second analysis step, or in both stages.

In the method for analyzing a sample according to the present invention, it is preferable that the liquid chromatograph include a plurality of trap columns and be configured to allow one of the trap columns to be selected and included in the column group by switching a passage, and to clean at least one of the remaining trap columns while the aforementioned one of the trap columns is included in the column group.

In the method for analyzing a sample according to the present invention, it is preferable that at least the supply of the first eluant in the first analysis step or the supply of the second eluant in the second analysis step be a gradient liquid supply.

Another method for analyzing a sample by liquid chromatograph mass spectrometry according to the present invention developed for solving the previously described problems includes:

a) a sample injection step in which a sample is injected into a passage leading to a column provided in a liquid chromatograph, where the column is packed with a mixture of a plurality of kinds of packing materials:

b) a first analysis step in which a first eluant is supplied to the column to separate a portion of the target components in the sample in the column and elute the separated components from the column to analyze the components with a mass spectrometer; and c) a second analysis step in which a second eluant that is different from the first eluant in composition is supplied to the column, to separate at least a portion of the target components which stayed uneluted in the column in the first analysis step, and elute the separated components from the column to analyze the components with the mass spectrometer.

Advantageous Effects of Invention

Thus, by a method for analyzing a sample by liquid chromatograph mass spectrometry according to the present invention, a considerable number of target components having a wide variety of characteristics contained in a sample can be analyzed by a single LC/MS analysis or LC/MS/MS analysis.

BRIEF DESCRIPTION OF DRAWINGS

FIG. 7 is a liquid-supply profile in the same embodiment.

DESCRIPTION OF EMBODIMENTS

The method for analyzing a sample according to the present invention is a method for performing mass spectrometry after appropriately separating each target component in the sample from the other target components and impurities by performing a plurality of LC separations with different separation characteristics using a plurality of kinds of packing materials and a plurality of kinds of eluants which differ from each other in composition. By this method, a quantitative analysis of a considerable number of target components having significantly different chemical or physical properties can be performed with a high level of reproducibility in an LC/MS/MS analysis or LC/MS analysis with a single introduction of a sample (such an analysis is hereinafter called a "single analysis").

The mass spectrometer to be used in the present invention may be any type of mass spectrometer capable of an analysis of sample components eluted from a liquid chromatograph. For example, a triple quadrupole mass analyzer, single quadrupole mass analyzer, or mass analyzer equipped with a matrix-assisted laser desorption/ionization (MALDI) ion source may be used.

The method for analyzing a sample in the present invention can be suitably used for an analysis of a sample which contains a considerable number of impurities that can cause ion suppression or ion enhancement, such as a biological sample (blood, urine, etc.), environmental sample or food sample, although the present invention is not limited to an analysis of those kinds of samples.

As for the plurality of kinds of packing materials, a plurality of packing materials which respectively correspond to different separation modes should be used. There are various separation modes in liquid chromatography, such as the reversed phase mode, normal phase mode, HILIC mode, ion exchange mode, ligand exchange mode, ion exclusion mode, size exclusion mode (GPC or GFC mode), and affinity mode. In the method for analyzing a sample according to the present invention, for example, a packing material corresponding to the ion exchange mode and one corresponding to the reversed phase mode can be used as the plurality of kinds of packing materials. It is also possible to use, as the plurality of kinds of packing materials, a plurality of packing materials which correspond to the same separation mode and differ from each other in the material (e.g. silica gel or polymer gel), shape, grain size or pore diameter of the base body forming the packing material, or in the kind of functional group bonded to the base body.

Figure 1:
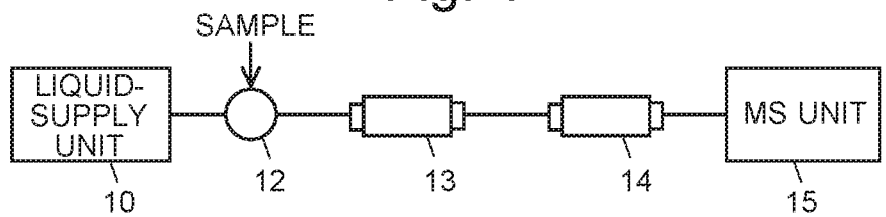
FIG. 1 is a diagram showing a schematic configuration of an LC-MS in the case of using a plurality of columns in a method for analyzing a sample according to the present invention.
Figure 2:
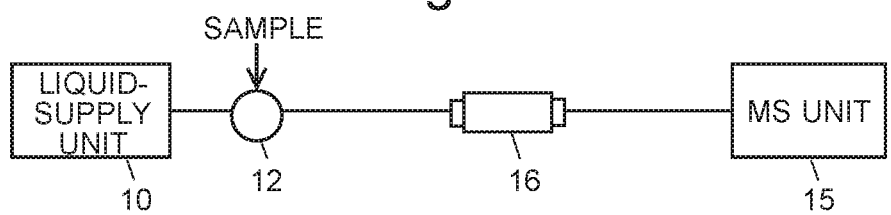
FIG. 2 is a diagram showing a schematic configuration of an LC-MS in the case of using a single column in a method for analyzing a sample according to the present invention.

The method for analyzing a sample according to the present invention can be realized, for example, by a liquid chromatograph mass spectrometer (LC-MS) as shown in FIG. 1 which includes a column group formed by serially connecting a plurality of columns 13 and 14 (there are two columns in the figure, although there may be three or more). The method can also be realized by an LC-MS which includes a single column 16 as shown in FIG. 2. In the former case, the columns 13 and 14 are respectively packed with different kinds of packing materials. In the latter case, the single column 16 is packed with a mixture of a plurality of kinds of packing materials. Additionally, in the case of using a plurality of columns, at least one column may be packed with a mixture of a plurality of kinds of packing materials. In the case of using a plurality of columns, all columns may be separation columns, or at least one column may be a trap column.

In the method for analyzing a sample according to the present invention, a sample is injected from a sample injector 12 into a passage of the eluant extending from a liquid-supply unit 10 to the column 13 or 16 in the LC-MS configured as shown in FIG. 1 or 2. A process for separating target components (component separation) in the column 13, 14 or 16 is subsequently performed multiple times using eluants having different compositions. The target components sequentially eluted from the column 14 or 16 along with this process are analyzed in an MS unit 15. The liquid supply for the separation of the target components may be an isocratic liquid supply in which an eluant having a fixed composition is supplied, or a gradient liquid supply in which an eluant prepared by mixing a plurality of kinds of solvents is supplied, with its mixture ratio changed in a continuous or stepwise manner (which may also be called the "stepwise liquid supply" in the case of the stepwise change). In the present invention, an isocratic liquid supply may be performed multiple times, or a gradient liquid supply may be performed multiple times. In the case of performing an isocratic liquid supply multiple times, the composition of the eluant should be changed for each supply of the liquid. In the case of performing a gradient liquid supply multiple times, at least one of the following conditions should be changed for each supply of the liquid: the combination of the used solvents, the mixture ratio of the solvents at the beginning of the gradient process, and the mixture ratio of the solvents at the end of the gradient process.

Figure 3:
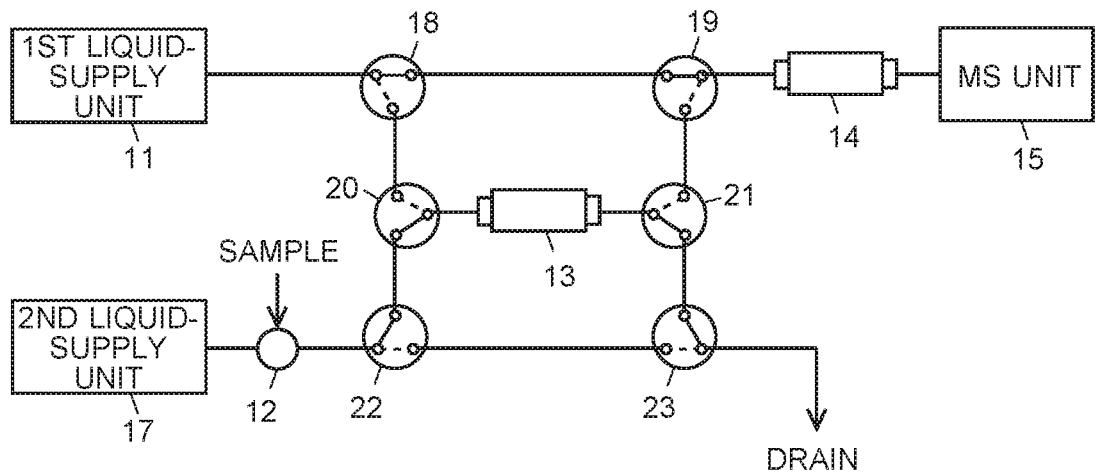
FIG. 3 is a diagram showing another example of the configuration of an LC-MS in the case of using a plurality of columns in a method for analyzing a sample according to the present invention.
Figure 4:
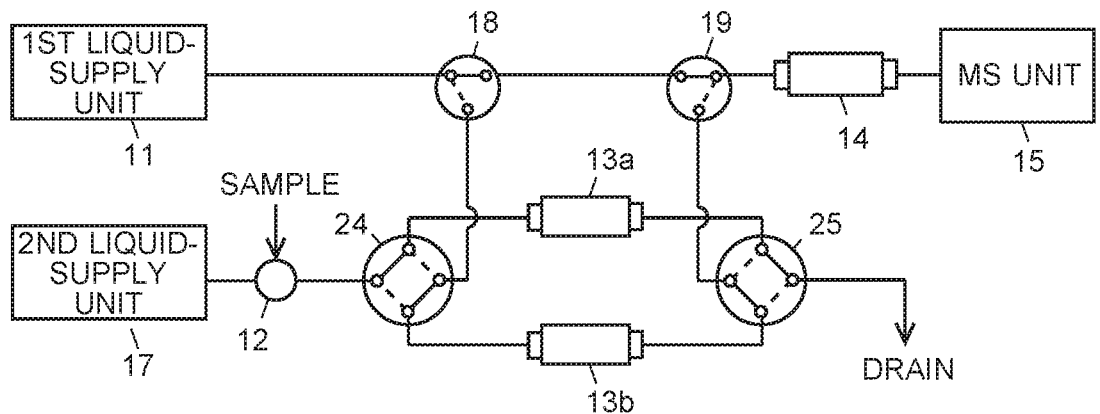
FIG. 4 is a diagram showing still another example of the configuration of an LC-MS in the case of using a plurality of columns in a method for analyzing a sample according to the present invention.

In the case of using a plurality of columns, for example, an LC-MS configured as shown in FIG. 3 or 4 may also be used. In the configuration of FIG. 3, the passage can be switched by the passage-switching units 18-23 between the state in which the column 13 is not connected to the column 14 (first state) and the state in which the columns 13 and 14 are serially connected (second state). Specifically, the first state is the state in which the passages inside the passage-switching units 18-23 are connected as indicated by the solid lines in FIG. 3, while the second state is the state in which the passages inside the passage-switching units 18-23 are connected as indicated by the dashed lines in FIG. 3. In the first state, the eluant supplied from the first liquid-supply unit 11 is directly sent to the column 14, while the eluant supplied from the second liquid-supply unit 17 is sent through the column 13 to the drain. In the second state, the eluant supplied from the first liquid-supply unit 11 is sent through the column 13 to the column 14, while the eluant supplied from the second liquid-supply unit 17 is directly sent to the drain.

In the LC-MS configured as shown in FIG. 3, for example, a method for analyzing a sample according to the present invention can be performed as follows, using a trap column as the column 13 and a separation column as the column 14:

(1) In the first state, a sample is injected from the sample injector 12 into the passage of the eluant supplied from the second liquid-supply unit 17, whereby the target components in the sample are trapped in the column 13.

(2) The passage is switched to the second state, and a predetermined solvent is supplied from the first liquid-supply unit 11, to elute a portion of the target components trapped in the column 13 and introduce the components into the column 14.

(3) The passage is switched to the first state, and a predetermined eluant is supplied from the first liquid-supply unit 11 to separate the target components by the column 14. The target components sequentially eluted from the column 14 are analyzed in the MS unit 15 (this step corresponds to the "first analysis step" in the present invention).

(4) The passage is switched to the second state, and an eluant which is different from the aforementioned predetermined eluant is supplied from the first liquid-supply unit 11 to elute the remaining portion of the target components from the column 13. The eluted components are separated by the column 14 and analyzed in the MS unit 15 (this step corresponds to the "second analysis step" in the present invention).

In the LC-MS configured as shown in FIG. 4, the passage can be switched by the passage-switching units 18 and 19 between the state in which the upstream column (13a or 13b in FIG. 4) is not connected to the downstream column 14 (first state) and the state in which those columns are serially connected (second state). Additionally, the passages inside the passage-switching units 24 and 25 can also be switched between the state indicated by the solid lines in FIG. 4 and the one indicated by the dashed lines to select one of the two parallel-connected columns 13a and 13b to be used for the analysis. Such a configuration allows an analysis to be similarly performed as with the LC-MS shown in FIG. 3. Furthermore, while one column 13a or 13b is used for the analysis, the other column which is not used for the analysis can be cleaned. This allows the sample analysis to be more efficiently performed. Both columns 13a and 13b used in the present case should be packed with the same kind of packing material.

EXAMPLE

Hereinafter described is an LC/MS/MS analysis of PFAAs and related substances in blood plasma carried out by the method for analyzing a sample according to the present invention.

Figure 5:
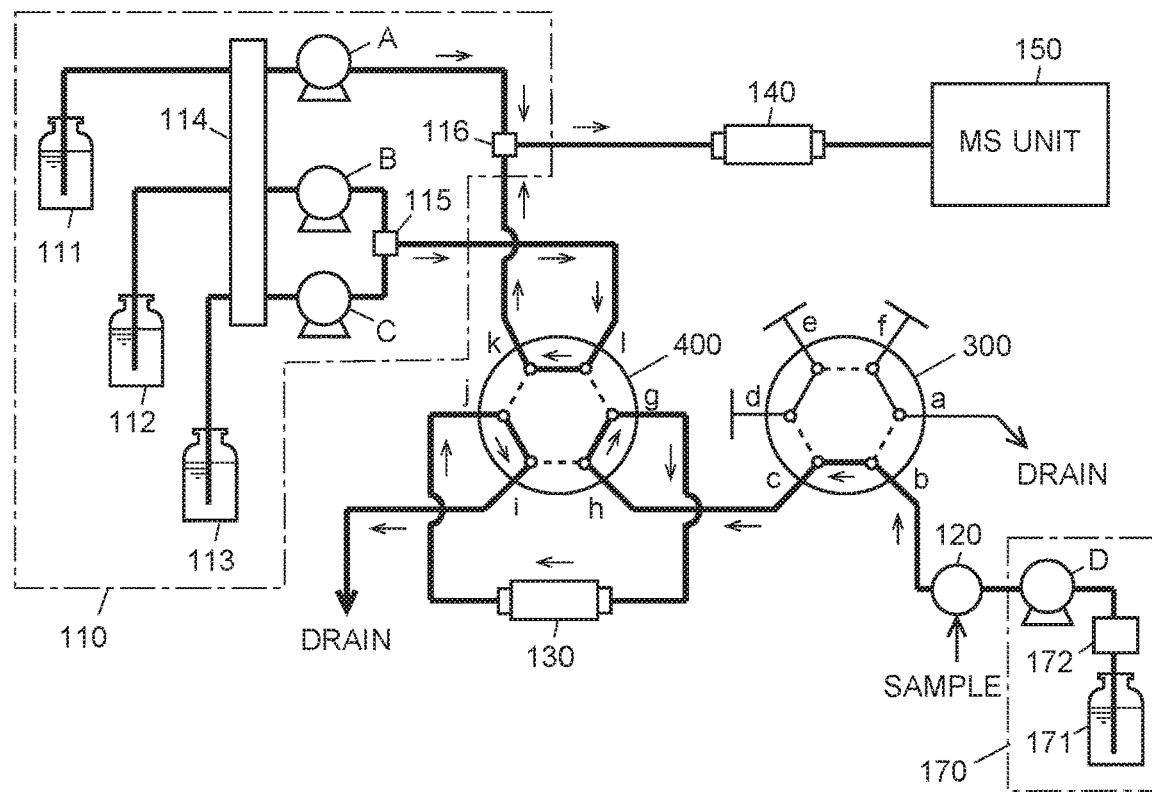
FIG. 5 is a passage configuration diagram showing the first state of the LC-MS in one embodiment of the present invention.
Figure 6:
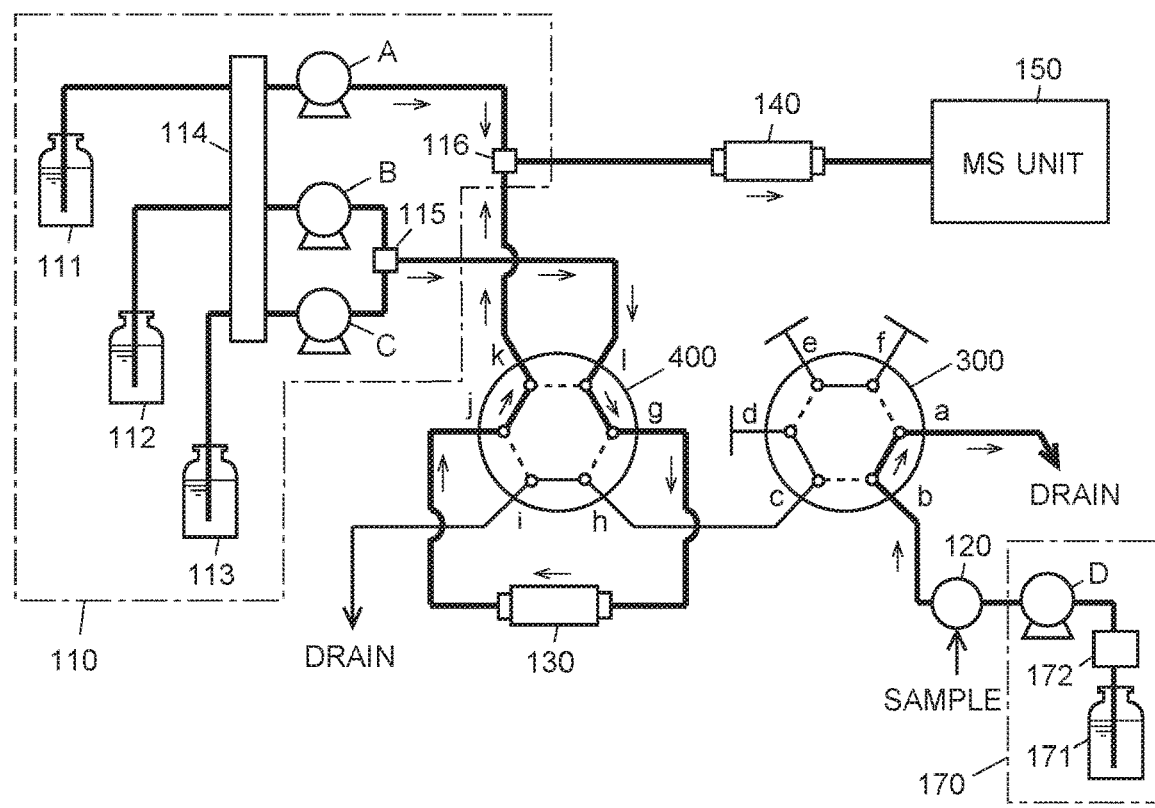
FIG. 6 is a passage configuration diagram showing the second state of the LC-MS in the same embodiment.

FIGS. 5 and 6 show the configuration of an LC-MS used for the sample analysis in the present example. This LC-MS, which is an embodiment of the configuration of FIG. 3, is configured to be switchable between the state in which column 130 is not connected to the column 140 (first state) and the state in which the two columns 130 and 140 are serially connected (second state).

The present LC-MS includes a first liquid-supply unit 110 for supplying a solvent for analysis, a second liquid-supply unit 170 for supplying a solvent for sample introduction, an autosampler 120, a first column 130, a second column 140, a first passage-switching valve 300, a second passage-switching valve 400, and an MS unit 150. The first liquid-supply unit 110 includes: solvent containers 111, 112 and 113 which respectively contain different solvents: pumps A, B and C for suctioning the solvents from the solvent containers 111, 112 and 113; a degasser 114 located in the passages between the solvent containers 111, 112 and 113 and the pumps A, B and C; a solvent mixer 115 for mixing the solvent suctioned by pump B with the solvent suctioned by pump C; and a solvent mixer 116 for mixing the solvent suctioned by pump A with the solvents mixed by the solvent mixer 115. The second liquid-supply unit 170 includes a solvent container 171, pump D for suctioning a solvent from the solvent container 171, and a degasser 172 located in the passage between the solvent container 171 and pump D. The passage on the downstream side of pump A is connected to the MS unit 150 via the solvent mixer 116 and the second column 140. The passages on the downstream side of the pumps B and C are merged together at the solvent mixer 115 and connected to the second passage-switching valve 400. The passage on the downstream side of pump D is connected to the first passage-switching valve 300 via the autosampler 120 for automatically introducing a sample into the passage.

The first passage-switching valve 300 and the second passage-switching valve 400 are six-way valves. The first passage-switching valve 300 has ports a-f. The second passage-switching valve 400 has ports g-l. These passage-switching valves 300 and 400 can be switched between the state in which the ports inside the valves are connected as indicated by the solid lines in FIG. 5 (first state) and the state in which the ports are connected as indicated by the solid lines in FIG. 6 (second state). Port a of the first passage-switching valve 300 is connected to the drain, while port b is connected to pump D via the autosampler 120. Port c of the first passage-switching valve 300 is connected to port h of the second passage-switching valve 400. Ports d, e and f of the first passage-switching valve 300 are closed. Port g of the second passage-switching valve 400 is connected to port j of the second passage-switching valve 400 via the first column 130. Port i is connected to the drain. Port k of the second passage-switching valve 400 is connected to the solvent mixer 116 located in the passage extending from pump A to the second column 140. Port l of the second passage-switching valve 400 is connected to the solvent mixer 115 located on the downstream side of the pumps B and C.

In the present example, Nexcera (manufactured by Shimadzu Corporation) was used as the liquid chromatograph, and LCMS-8060 (manufactured by Shimadzu Corporation) was used as the mass spectrometer (MS unit 150). Oasis WAX, which is a trap column manufactured by Waters Corporation, was used as the first column 130, while Triart C18, which is a separation column manufactured by YMC CO., LTD., was used as the second column 140. Furthermore, in the present example, a 2.5 mM aqueous ammonium acetate solution (2.5 mM $NH_4Ac\_H_2O$) was used as the solvent supplied by pump A (i.e. the solvent contained in the solvent container 111). A 95% methanol solution having an ammonium acetate content of 2.5 mM (2.5 mM $NH_4Ac\_95\%$ MeOH) was used as the solvent supplied by pump B (the solvent contained in the solvent container 112). A methanol solution having an ammonia content of 0.1% (0.1% $NH_3\_MeOH$) was used as the solvent supplied by pump C (the solvent contained in the solvent container 113). Ultrapure water was used as the solvent supplied by pump D (the solvent contained in the solvent container 171). Blood plasma to which organic fluorine compounds were added was used as the sample. The injection volume was 500 μL (250 μL of water+250 μL of sample).

An analyzing operation in the present example is hereinafter described with reference to the liquid-supply profile in FIG. 7. The thick solid line in FIG. 7 is indicates the total of the flow rates (mL/min) of the pumps A, B and C (which is hereinafter called the "total flow rate T"). The thin solid line indicates the ratio (%) of the flow rate of pump B in the total flow rate T. The dashed line indicates the ratio (%) of the flow rate of pump C in the total flow rate T. Although the ratio (%) of the flow rate of pump A is not shown in FIG. 7, it should naturally be understood that the flow-rate ratio equal to the value obtained by subtracting the ratio (%) of pump B and that of pump C from 100%. The long dashed short dashed line in FIG. 7 indicates the flow rate (mL/min) of pump D.

(1) Sample Loading Process

Initially, the LC-MS is in the first state (FIG. 5). The flow-rate ratio of pump B is 65%, the flow-rate ratio of pump C is 0%, the total flow rate is 0.3 mL/min. and the flow rate of pump D is 1.0 mL/min. Under these conditions, a sample is injected from the autosampler 120 (this point in time is defined as 0.00 min in the liquid-supply profile). The injected sample is trapped in the first column 130.

(2) First Elution Process

At 2.00 min from the injection of the sample, the flow rate of pump D is set to zero while the flow-rate ratios of pumps B and C as well as the total flow rate T are maintained, and the LC-MS is switched to the second state (FIG. 6). Under these conditions, a mixed liquid in which the solvent from pump A (2.5 mM aqueous ammonium acetate solution) and the solvent from pump B (95% methanol having an ammonium acetate content of 2.5 mM) are mixed at a ratio of 35% to 65% flows into the first column 130 and the second column 140. Consequently, among the target components trapped in the first column 130, only the components which are weakly bonded to the packing material in the first column 130 (specifically, N-MeFOSA-M and N-EtFOSA-M) are eluted from the first column 130 and flow into the second column 140.

(3) First Analysis Process

At 3.50 min from the sample injection, the LC-MS is switched to the first state (FIG. 5), and the conditions are changed as follows: the flow-rate ratio of pump B, 87.5%; the flow-rate ratio of pump C, 0%; and the total flow rate T, 0.5 mL/min. Under these conditions, a mixed liquid in which the solvent from pump A (2.5 mM aqueous ammonium acetate solution) and the solvent from pump B (95% methanol having an ammonium acetate content of 2.5 mM) are mixed at a ratio of 12.5% to 87.5% flows into the second column 140. The components eluted from the first column 130 in Process (2), i.e. N-MeFOSA-M and N-EtFOSA-M, are temporally separated from each other by the second column 140 and sequentially eluted from the column 140, to be analyzed in the MS unit 150. In this process, since the first column 130 is separated from the passage of the mixed liquid, the remaining target components trapped in the first column 130 will not be eluted from the first column 130.

(4) Second Elution Process

At 7.50 min from the sample injection, the LC-MS is switched to the second state (FIG. 6), and the conditions are changed as follows: the flow-rate ratio of pump B, 0%; the flow-rate ratio of pump C, 7.5%, and the total flow rate T, 0.25 mL/min. Under these conditions, a mixed liquid in which the solvent from pump A (2.5 mM aqueous ammonium acetate solution) and the solvent from pump C (NH$_3$_MeOH) are mixed at a ratio of 92.5% to 7.5% flows into the first column 130 and the second column 140. Due to the action of NH$_3$ contained in the mixed liquid, the remaining target components trapped in the first column 130 are eluted and flow into the second column 140. It should be noted that the mixed liquid acts as an eluant having weak eluting power in the second column 140. Therefore, the remaining target components mentioned earlier stay in an entrance area of the second column 140 and temporarily become concentrated. Meanwhile, the liquid within the second column 140 is completely replaced by the mixed liquid (i.e. the column is equilibrated).

(5) Second Analysis Process

From 11.50 min to 23.00 min after the sample injection, the flow-rate ratio of pump B is gradually increased from 0% to 80% (gradient liquid supply). The eluting power of the eluant flowing into the second column 140 gradually increases, causing the components adsorbed in the entrance area of the second column 140 to be separated according to their polarities and sequentially eluted from the second column 140, to be analyzed in the MS unit 150. At 23.00 min from the sample injection, the flow-rate ratio of pump B is changed to 90%, whereby the second column 140 is cleaned.

(6) Equilibration Process

At 26.50 min from the sample injection, the LC-MS is switched to the first state (FIG. 5). Then, while the flow-rate ratios of pumps A-C are maintained, the total flow rate T is changed to 0.3 mL/min, and the flow rate of pump D is changed to 1.0 mL/min, to equilibrate the first column 130 and the second column 140.

The recovery percentages of the internal standards determined by the previously described analysis are shown in Table 1.

TABLE 1

| No. | Compounds | IS Rec. (%) |
|---|---|---|
| 01 | PFBA | 58.2 |
| 02 | PFPeA | 83.1 |
| 03 | PFHxA | 85.2 |
| 04 | PFHpA | 84.5 |
| 05 | PFOA | 96.8 |
| 06 | PFNA | 86.4 |
| 07 | PFDA | 94.1 |
| 08 | PFUnA | 89.5 |
| 09 | PFDoA | 82.3 |
| 10 | PFtriDA | 44.6 |
| 11 | PFteDA | 44.6 |
| 12 | PFHxDA | 46.8 |
| 13 | PFODA | 46.8 |
| 14 | PFBS | 96.0 |
| 15 | PFHxS | 73.7 |
| 16 | PFHpS | 92.3 |
| 17 | PFOS | 92.3 |
| 18 | PFDS | 92.3 |
| 19 | N—MeFOSA—A | 71.6 |
| 20 | N—EtFOSA—A | 81.1 |
| 21 | N—MeFOSA—M | 82.7 |
| 22 | N—EtFOSA—M | 70.9 |
| 23 | 4:2FTS | 44.7 |
| 24 | 6:2FTS | 173.6 |
| 25 | 8:2FTS | 142.6 |
| 26 | 6:2diPAP | 78.7 |
| 27 | 8:2diPAP | 71.8 |
| 28 | diSAmPAP | 71.8 |

As shown in Table 1, in the measurement according to the present example, recovery percentages of equal to or higher than 50% were obtained for all target compounds except for PFtriDA, PFteDA, PFHxDA, PFODA and 4:2FTS. This is most likely to an improvement in ion suppression. The recovery percentages for PFtriDA, PFteDA, PFHxDA, PFODA and 4:2FTS were also comparatively high and equal to or higher than 40%. As for 6:2FTS and 8:2FTS, the ion enhancement could not be improved, and the recovery percentage exceeded 100%. This is most likely to be due to an insufficient cleaning of the columns.

REFERENCE SIGNS LIST

10 . . . Liquid-Supply Unit
11, 110 . . . First Liquid-Supply Unit
17, 170 . . . Second Liquid-Supply Unit
12 . . . Sample Injector
120 . . . Autosampler
13, 13*a*, 13*b*, 14, 16 . . . Column
130 . . . First Column
10 140 . . . Second Column
15, 150 . . . MS Unit
18, 24 . . . Passage-Switching Unit
300 . . . First Passage-Switching Valve
400 . . . Second Passage-Switching Valve

The invention claimed is:

1. A method for analyzing a sample by liquid chromatograph mass spectrometry, comprising:
   a) a sample injection step in which a sample is injected into a column located most upstream in a column group provided in a liquid chromatograph, the column group including a plurality of columns which are configured to be serially connectable to each other and are packed with different kinds of packing materials;
   b) a first analysis step in which a first liquid supply that is an isocratic liquid supply or gradient liquid supply is performed for one of one column or a plurality of serially connected columns including a column located most downstream in the column group, to separate a portion of target components in the sample in the one or plurality of serially connected columns, and sequentially elute the separated components from the most downstream column to analyze the components with a mass spectrometer; and
   c) a second analysis step in which a second liquid supply that is an isocratic liquid supply or gradient liquid supply and is different from the first liquid supply in separation characteristics is performed for one of one column or a plurality of serially connected columns including the most downstream column in the column group, to separate at least a portion of the target components in the sample which stayed uneluted in the one column or the plurality of serially connected columns in the first analysis step, and sequentially elute the separated components from the most downstream column to analyze the components with the mass spectrometer,
   wherein at least one column which is included in the plurality of columns and is not the most downstream column is a trap column, while the other columns are separation columns.

2. The method for analyzing a sample by liquid chromatograph mass spectrometry according to claim 1, wherein the different kinds of packing materials include at least a packing material corresponding to an ion exchange mode and a packing material corresponding to a reversed phase mode.

3. The method for analyzing a sample by liquid chromatograph mass spectrometry according to claim 1, wherein the liquid chromatograph includes a plurality of trap columns and is configured to allow one of the trap columns to be selected and included in the column group by switching a passage, and to clean at least one of the remaining trap columns while the aforementioned one of the trap columns is included in the column group.

4. The method for analyzing a sample by liquid chromatograph mass spectrometry according to claim 1, wherein at least the first liquid supply in the first analysis step or the second liquid supply in the second analysis step is a gradient liquid supply.

* * * * *